United States Patent
Yun et al.

(10) Patent No.: US 12,482,852 B2
(45) Date of Patent: Nov. 25, 2025

(54) MANUFACTURING METHOD OF LITHIUM SECONDARY BATTERY INCLUDING A STEP OF CHARGING THE BATTERY BASED ON A CATHODE LOAD AMOUNT

(71) Applicant: LG ENERGY SOLUTION, LTD., Seoul (KR)

(72) Inventors: Hyunwoong Yun, Daejeon (KR); Ohbyong Chae, Daejeon (KR); Jeongbeom Lee, Daejeon (KR); Byong Seon Lee, Daejeon (KR); Hoejin Hah, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 792 days.

(21) Appl. No.: 17/623,698

(22) PCT Filed: Oct. 14, 2020

(86) PCT No.: PCT/KR2020/013959
§ 371 (c)(1),
(2) Date: Dec. 29, 2021

(87) PCT Pub. No.: WO2021/091108
PCT Pub. Date: May 14, 2021

(65) Prior Publication Data
US 2022/0278358 A1    Sep. 1, 2022

(30) Foreign Application Priority Data

Nov. 7, 2019  (KR) .......................... 10-2019-0141790
Oct. 8, 2020  (KR) .......................... 10-2020-0129950

(51) Int. Cl.
*H01M 10/052*    (2010.01)
*H01M 4/04*    (2006.01)
(Continued)

(52) U.S. Cl.
CPC ..... *H01M 10/0525* (2013.01); *H01M 4/0404* (2013.01); *H01M 4/382* (2013.01);
(Continued)

(58) Field of Classification Search
CPC ........... H01M 10/0525; H01M 10/052; H01M 10/446; H01M 4/0404; H01M 4/382;
(Continued)

(56) References Cited

U.S. PATENT DOCUMENTS

2002/0018935 A1    2/2002  Okada
2006/0068291 A1    3/2006  Herzel et al.
(Continued)

FOREIGN PATENT DOCUMENTS

CN    105474450 A    4/2016
CN    109526240 A    3/2019
(Continued)

OTHER PUBLICATIONS

Abe et al., "Effect of negative/positive capacity ratio on the rate and cycling performances of LiFePO$_4$/ graphite lithium-ion batteries", Journal of Energy Storage 2018, vol. 19, pp. 96-102.
(Continued)

*Primary Examiner* — Raymond Alejandro
(74) *Attorney, Agent, or Firm* — Birch, Stewart, Kolasch & Birch, LLP

(57) ABSTRACT

A method for manufacturing a lithium secondary battery that can exhibit improved capacity and energy density compared to existing lithium ion batteries and lithium metal secondary batteries, and has excellent safety and lifetime characteristics. The method includes assembling a battery comprising an anode, a cathode, a separator, and an electrolyte, and charging the battery. In the step of assembling the battery, a ratio of an anode load amount to a cathode load amount (N/P
(Continued)

ratio) is 0.01 to 0.99, and in the step of charging the battery, charging is performed based on the cathode load amount.

7 Claims, 1 Drawing Sheet

(51) Int. Cl.
*H01M 4/38* (2006.01)
*H01M 4/485* (2010.01)
*H01M 4/505* (2010.01)
*H01M 4/525* (2010.01)
*H01M 10/0525* (2010.01)
*H01M 10/44* (2006.01)
*H01M 4/02* (2006.01)

(52) U.S. Cl.
CPC .......... *H01M 4/485* (2013.01); *H01M 4/505* (2013.01); *H01M 4/525* (2013.01); *H01M 10/446* (2013.01); *H01M 2004/027* (2013.01); *H01M 2004/028* (2013.01)

(58) Field of Classification Search
CPC ...... H01M 4/485; H01M 4/505; H01M 4/525; H01M 2004/027; H01M 2004/028
See application file for complete search history.

(56) References Cited

U.S. PATENT DOCUMENTS

| | | | |
|---|---|---|---|
| 2014/0197802 A1* | 7/2014 | Yamazaki | H01M 10/0525 320/137 |
| 2014/0375279 A1 | 12/2014 | Nishino et al. | |
| 2016/0133933 A1 | 5/2016 | Choi et al. | |
| 2016/0172660 A1 | 6/2016 | Fischer et al. | |
| 2016/0190642 A1* | 6/2016 | Fukunaga | H01M 10/0525 320/136 |
| 2016/0197376 A1 | 7/2016 | Koshiba et al. | |
| 2017/0207497 A1 | 7/2017 | Chae | |
| 2018/0048025 A1 | 2/2018 | Jilek et al. | |
| 2018/0226633 A1 | 8/2018 | Fujiki et al. | |
| 2019/0044137 A1 | 2/2019 | Zhamu et al. | |
| 2019/0051905 A1 | 2/2019 | Zhamu et al. | |
| 2019/0221852 A1* | 7/2019 | Nishimura | H01M 10/4235 |
| 2019/0260066 A1 | 8/2019 | Hu et al. | |
| 2019/0341601 A1 | 11/2019 | Park et al. | |
| 2020/0235419 A1 | 7/2020 | Chae et al. | |
| 2023/0187705 A1 | 6/2023 | Suzuki et al. | |

FOREIGN PATENT DOCUMENTS

| | | |
|---|---|---|
| CN | 110400961 A | 11/2019 |
| JP | 2002-237293 A | 8/2002 |
| JP | WO2013/046690 A1 | 4/2013 |
| JP | 2015-69809 A | 4/2015 |
| JP | 2019-96475 A | 6/2019 |
| JP | 2019-96610 A | 6/2019 |
| JP | 2019-145299 A | 7/2025 |
| KR | 10-2010-0099359 A | 9/2010 |
| KR | 10-2015-0014878 A | 2/2015 |
| KR | 10-2015-0028739 A | 3/2015 |
| KR | 10-2017-0086876 A | 7/2017 |
| KR | 10-2018-0138546 A | 12/2018 |
| KR | 10-2019-0007296 A | 1/2019 |
| KR | 10-2019-0100078 A | 8/2019 |
| KR | 10-2019-0124038 A | 11/2019 |

OTHER PUBLICATIONS

International Search Report (PCT/ISA/210) issued in PCT/KR2020/013959 mailed on Feb. 3, 2021.
Third Party Observation dated Feb. 22, 2023 of the corresponding European Patent Office Application No. 20885458.8.
Extended European Search Report for European Application No. 20885458.8, dated Jul. 12, 2022.

\* cited by examiner

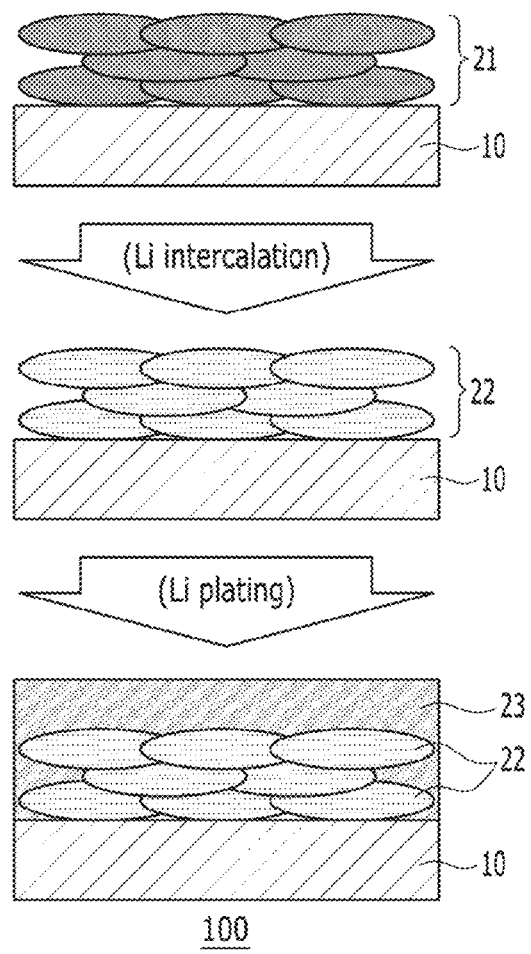

MANUFACTURING METHOD OF LITHIUM SECONDARY BATTERY INCLUDING A STEP OF CHARGING THE BATTERY BASED ON A CATHODE LOAD AMOUNT

CROSS CITATION WITH RELATED APPLICATION(S)

This application claims the benefit of Korean Patent Application No. 10-2019-0141790 filed on Nov. 7, 2019 and Korean Patent Application No. 10-2020-0129950 filed on Oct. 8, 2020 with the Korean Intellectual Property Office, each of which is incorporated herein by reference in its entirety.

TECHNICAL FIELD

The present disclosure relates to a method for manufacturing a lithium secondary battery.

BACKGROUND ART

Lithium secondary batteries developed in the early 1990's have received a great deal of attention due to their advantages of higher operating voltages and much higher energy densities than traditional batteries using aqueous electrolyte solutions, such as Ni-MH batteries, Ni—Cd batteries. $H_2SO_4$—Pb batteries, and the like. Recently, with the increase of demand for electric vehicle or the like, the necessity for lithium secondary batteries having high energy density is expanded.

Lithium metal secondary batteries using lithium metal as an anode active material can significantly improve energy density compared to conventional lithium ion batteries using carbon-based and silicon-based active materials, and thus, continuous research is being conducted.

However, since lithium metal is highly reactive and easily reacts with moisture and oxygen in the air, the assembly process is complicated, and there is a problem that the lithium metal grows into a dendrite and causes a battery short circuit while the dissolution and precipitation reaction of the lithium metal occurs during operation.

Therefore, continuous efforts are conducted to develop a lithium secondary battery having improved safety and lifetime characteristics while having a high capacity compared to the conventional lithium ion battery.

DETAILED DESCRIPTION OF THE INVENTION

Technical Problem

It is an object of the present disclosure to provide a lithium secondary battery that can achieve higher energy density and has better safety and lifetime characteristics as compared with conventional lithium ion batteries.

Technical Solution

According to an embodiment of the present disclosure, there is provided a method for manufacturing a lithium secondary battery comprising the steps of:
assembling a battery comprising an anode having an anode active material layer coated onto at least one surface of an anode current collector; a cathode having a cathode active material layer coated onto at least one surface of a cathode current collector; a separator; and an electrolyte, and
charging the battery,
wherein in the step of assembling the battery, a ratio of an anode load amount to a cathode load amount (N/P ratio) is 0.01 to 0.99, and
wherein in the step of charging the battery, charging is performed to correspond to the cathode load amount.

DETAILED DESCRIPTION OF THE EMBODIMENTS

The FIGURE is a schematic diagram illustrating a change of an anode in a method of manufacturing a lithium secondary battery of the present disclosure.

DETAILED DESCRIPTION OF THE EMBODIMENTS

The terms used herein are used only to describe exemplary embodiments, and are not intended to limit the present disclosure. A singular expression includes a plural expression unless they have definitely opposite meanings in the context. It should be understood that the terms "comprise", "include", and "have" as used herein are intended to designate the presence of stated features, numbers, steps, constitutional elements, or combinations thereof, but it should be understood that they do not preclude a possibility of existence or addition of one or more other features, numbers, steps, constitutional elements, or combinations thereof.

Since the present disclosure may be modified in various forms, and may have various embodiments, the following exemplary embodiments are illustrated and described in detail. However, this is not intended to limit the present disclosure to specific embodiments, and the present disclosure should be construed to encompass various changes, equivalents, and substitutions within the technical scope and spirit of the invention.

The present disclosure relates to a method of manufacturing a lithium secondary battery that exhibits a high energy density and has excellent safety and lifetime characteristics as compared with a conventional lithium ion battery and a lithium metal secondary battery.

According to an embodiment of the present disclosure, there is provided a method for manufacturing a lithium secondary battery comprising the steps of:
assembling a battery comprising an anode in which an anode active material layer is coated onto an anode current collector; a cathode in which a cathode active material layer is coated onto a cathode current collector; a separator; and an electrolyte, and
charging the battery,
wherein in the step of assembling the battery, a ratio of an anode load amount to a cathode load amount (N/P ratio) is 0.01 to 0.99, and
wherein in the step of charging the battery, charging is performed to correspond to the cathode load amount.

In conventional lithium ion batteries, carbon-based materials such as artificial graphite, natural graphite, and hard carbon capable of intercalation/deintercalation of lithium have been widely applied as an anode active material. In particular, graphite is mainly used in commercial batteries due to its structural stability, low electron chemical reactivity, and excellent lithium ion storage capacity, but the theoretical capacity is about 372 mAh/g, which has a limitation to its application to high-capacity batteries.

Therefore, as a high-capacity anode material, silicon, tin and the like, which can react with lithium to form an alloy, are being studied as alternative materials, but these have a problem associated with a significant volume change when lithium ions are inserted/desorbed.

On the other hand, in the case of lithium metal, which can theoretically achieve the highest capacity, it has a high reactivity with moisture and oxygen and is difficult to handle due to its brittle nature, and there is a problem that processability is deteriorated during manufacture of lithium metal electrodes. Further, a lithium metal electrode composed of a current collector and a thin film of lithium metal may cause a phenomenon in which lithium metal is precipitated in a dendritic shape due to uneven electron density on the electrode surface in the process of lithium plating and dissolution during battery operation. In this case, the lithium metal (lithium dendrite) precipitated in a dendritic shape cannot be used as an active material, and when the dendritic lithium continues to grow, there is a problem of causing a battery short circuit.

Thus, in the present disclosure, the battery is assembled using an anode including a conventional anode active material, excluding lithium metal, wherein the battery is assembled by setting the ratio of the anode load amount to the cathode load amount, that is, the N/P ratio to be lower than that of a normal battery, and then charged by the cathode load amount that is higher than the anode load amount, whereby intercalation of the anode active material and plating of lithium metal are continuously performed, thereby manufacturing a lithium secondary battery. In the lithium secondary battery thus manufactured, both the anode active material previously included during the battery assembly and the plated lithium metal due to charging are used as the anode active material, and thus, it exhibits improved safety and lifetime characteristics while having a high capacity as compared with the conventional lithium ion battery and lithium metal secondary battery.

That is, according to the manufacturing method of the present disclosure, the anode of the finally manufactured lithium secondary battery has a structure including an anode active material layer coated onto a current collector and a lithium metal layer formed on at least one surface of the anode active material layer in the charging process. However, in the step of assembling the battery, since lithium metal is not separately handled, blocking of moisture and oxygen is unnecessary and thus, the assembly process is simple. Further, when lithium metal is plated, since the specific surface area of the anode active material layer, which is the plating surface, is very large, the current density and overvoltage are significantly lower as compared with the lithium metal thin film. Therefore, the lithium metal does not grow in a dendritic shape and can be uniformly plated on the surface of the anode active material layer. Consequently, the plated lithium metal can be used as an active material.

Hereinafter, the present disclosure will be described in detail.

In the method for manufacturing a lithium secondary battery of the present disclosure, first, a battery including an anode in which an anode active material layer is coated onto an anode current collector; a cathode in which a cathode active material layer is coated onto a cathode current collector; a separator; and an electrolyte is assembled. At this time, the ratio of an anode load amount to a cathode load amount (N/P ratio) is set to satisfy the range of 0.01 to 0.99.

The cathode and anode current collector are not particularly limited as long as it has conductivity without causing chemical changes in the battery.

For example, the cathode current collector may include stainless steel, aluminum, nickel, titanium, baked carbon, or a material formed by surface-treating a surface of aluminum or stainless steel with carbon, nickel, titanium, silver, or the like.

Further, the anode current collector may include copper, stainless steel, aluminum, nickel, titanium, baked carbon, or a material formed by surface-treating a surface of copper or stainless steel with carbon, nickel, titanium, silver, or the like.

The current collector may be formed in various forms such as a film, a sheet, a foil, a net, a porous body, a foaming body, and a non-woven fabric structure. The thickness of the current collector may be in the range of 3 to 500 μm.

The anode active material layer includes an anode active material, a binder, and optionally a conductive material.

As the anode active material, a carbon-based active material, an alloy of lithium metal, and/or a material capable of reversibly forming a lithium-containing compound by reacting with lithium ions may be used. However, lithium metal is excluded.

As the carbon-based active material, crystalline carbon, amorphous carbon, or a combination thereof may be used. Examples of the crystalline carbon may include graphite such as natural graphite or artificial graphite, and the graphite may be in the form of amorphous, planar, flaky, spherical or fibrous graphite. Examples of the amorphous carbon may be soft carbon (low temperature calcined carbon), hard carbon, mesophase pitch based carbon, calcined coke, and the like.

The alloy of lithium metal may be an alloy of lithium(Li) and a metal selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), germanium (Ge) and tin (Sn).

Examples of the material capable of reversibly forming a lithium-containing compound by reacting with lithium ions may be a silicon-based active material and a tin-based active material. Specific examples thereof may include Si, SiOx (0<x<2), Si—C composite, Si-Q alloy (the Q is an alkali metal, an alkaline earth metal, a Group 13 to 16 element, a transition metal, a rare earth element, or a combination thereof, but is not Si), Sn, $SnO_2$, Sn—C complex, Sn—R (the R is an alkali metal, an alkaline earth metal, a Group 13 to 16 element, a transition metal, a rare earth element, or a combination thereof, but is not Sn), and the like. Specific elements of Q and R may include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po or a combination thereof.

Further, lithium titanium oxide (LTO) may be used as the anode active material. The lithium titanium oxide may be represented by the formula $Li_aTi_bO_4$ (0.5≤a≤3, 1≤b≤2.5), and specifically it may be $Li_{0.8}Ti_{2.2}O_4$, $Li_{2.67}Ti_{1.33}O_4$, $LiTi_2O_4$, $Li_{1.33}Ti_{1.67}O_4$, $Li_{1.14}Ti_{1.71}O_4$ or the like, but is not limited thereto.

The anode active material described above is preferably contained in an amount of 70 to 99.5% by weight, or 80 to 99% by weight of the total weight of the anode active material layer (that is, the negative electrode active material layer in the battery assembly step before the lithium metal layer is formed, and the same applies hereinafter). When the content of the anode active material is less than 70% by weight, it may be disadvantageous in the energy density, and when the content of the anode active material exceeds 99.5% by weight, there may be a problem in that the amount of the binder is insufficient and the active material is peeled off. However, in the case of the lithium metal alloy, since it can be used by electroplating on the current collector in the form of a foil without a binder, it can be used at 100% by weight.

The binder serves to attach the active material particles to each other well, and also to attach the active material to the current collector well. As typical example thereof, polyvinyl alcohol, carboxymethyl cellulose, hydroxypropylcellulose, diacetylcellulose, polyvinyl chloride, carboxylated polyvinyl chloride, polyvinyl fluoride, polymer containing ethylene oxide, polyvinylpyrrolidone, polyurethane, polytetrafluoroethylene, polyvinylidene fluoride, polyethylene, polypropylene, styrene-butadiene rubber, acrylate-butadiene rubber, epoxy resin, nylon, etc. but is not limited thereto.

The conductive material is used to impart conductivity to the electrode, and any conductive material can used without particular limitation as long as it has electronic conductivity without causing a chemical change in the battery. Specific examples thereof include carbon-based material, such as natural graphite, artificial graphite, carbon black, acetylene black, ketjen black, and carbon fiber; metal-based material, for example, metal powders or metal fibers such as copper, nickel, aluminum, and silver; conductive polymers such as polyphenylene derivatives; or mixtures thereof may be used.

The cathode active material layer includes a cathode active material, a binder, and optionally a conductive material. At this time, as the binder and the conductive material, the above-described binder and the conductive material may be used.

As the cathode active material, a compound known in the art as a material capable of reversibly intercalating and de-intercalating lithium ions can be used without particular limitation. Specifically, the cathode active material may include a lithium composite metal oxide including at least one metal such as cobalt, manganese, nickel, or aluminum, and lithium.

The lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where, $0<Y<1$), $LiMn_{2-Z}Ni_ZO_4$ (where, $0<Z<2$), etc.), lithium-nickel-cobalt-based oxide (e.g., $LiNi_{1-Y1}Co_{Y1}O_2$ (where, $0<Y1<1$), etc.), lithium-manganese-cobalt-based oxide (e.g., $LiCo_{1-Y2}Mn_{Y2}O_2$ (where, $0<Y2<1$), $LiMn_{2-Z1}Co_{Z1}O_4$ (where, $0<Z1<2$), etc.), lithium-nickel-manganese-cobalt-based oxide (e.g., $Li(Ni_pCo_qMn_{r1})O_2$ (where, $0<p<1$, $0<q<1$, $0<r1<1$, $p+q+r1=1$) or $Li(Ni_{p1}Co_{q1}Mn_{r2})O_4$ (where, $0<p1<2$, $0<q1<2$, $0<r2<2$, $p1+q1+r2=2$), etc.), or lithium-nickel-cobalt-transition metal (M) oxide (e.g., $Li(Ni_{p2}Co_{q2}Mn_{r3}M_{S2})O_2$ (where, M is at least one selected from the group consisting of Al, Fe, V, Cr, Ti, Ta, Mg and Mo, p2, q2, r3 and s2 are atomic fractions of each independent element, $0<p2<1$, $0<q2<1$, $0<r3<1$, $0<s2<1$, $p2+q2+r3+s2=1$), etc.), and any one or two or more of these compounds may be included.

Further, in order to supply a sufficient amount of lithium ions to the negative electrode when charging after assembling the battery, Ni-rich cathode material (NCM811, NCM911) or Li-rich cathode material (over-lithiated layered oxide: $xLi_2MnO_3 \cdot (1-x)LiMO_2$, where $0<x<1$) can be used, and specifically, it is preferable to use $Li[Li_{0.2}Mn_{0.54}Ni_{0.13}Co_{0.13}]O_2$.

Further, the load amount per unit area of the cathode active material layer is preferably 4 to 15 $mAh/cm^2$, 5 to 10 $mAh/cm^2$, or 5 to 8 $mAh/cm^2$. When the above-described load amount range is satisfied, a sufficient amount of lithium ions may be supplied to the anode from the cathode active material in the charging step of the battery.

Meanwhile, the cathode active material layer of the present disclosure may further include an irreversible additive to supply a sufficient amount of lithium ions to the anode. The irreversible additive refers to a material that is irreversible after the lithium ions are desorbed during the initial charging of the battery, that is, does not absorb the desorbed lithium ions again.

At this time, lithium ions may remain in the irreversible additive converted to the irreversible phase, and the remaining lithium ions are absorbed and desorbed reversibly, but lithium ions released during initial charging are not absorbed again as an irreversible compensation additive during subsequent discharge but are plated on the anode.

The irreversible additive is not particularly limited as long as it is a compound having the above-described effect, and specifically, it may be at least one selected from the group consisting of $Li_{7/3}Ti_{5/3}O_4$, $Li_{2.3}Mo_6S_{7.7}$, $Li_2NiO_2$, $Li_2CuO_2$, $Li_6CoO_4$, $Li_5FeO_4$, $Li_6MnO_4$, $Li_2MoO_3$, $Li_3N$, $Li_2O$, $LiOH$ and $Li_2CO_3$. Among them, in terms of stable life performance and energy density, at least one selected from the group consisting of $Li_2NiO_2$, $Li_6CoO_4$, and $Li_3N$ may be preferably used.

The irreversible additive is preferably present in an amount of 10% by weight or less of the total weight of the cathode active material layer. When the amount of the irreversible additive exceeds 10% by weight of the total weight of the cathode active material layer, it may lead to a problem of gelation during preparation of the cathode slurry. The irreversible additive is a material that is selectively used to supply a greater amount of lithium ions to the anode, but the lower limit is not limited.

The method of manufacturing the anode and the cathode is not particularly limited. For example, they can be manufactured by a process in which an active material, a binder, optionally, a conductive material and/or an irreversible additive are mixed in an organic solvent to prepare an active material slurry, and the prepared active material slurry is coated and dried on a current collector, and optionally, subjected to a compression molding on a current collector.

As the organic solvent, those in which an active material, a binder, a conductive material, and an irreversible additive can be uniformly dispersed and are easily evaporated are preferred. Specifically, N-methylpyrrolidone, acetonitrile, methanol, ethanol, tetrahydrofuran, water, and isopropyl alcohol may be exemplified, but are not limited thereto.

Meanwhile, the load amount of the anode and the cathode has an N/P ratio (=anode load amount/cathode load amount) in the range of 0.01 to 0.99. In this way, when the anode load amount is significantly lower than the cathode load amount during the initial assembly of the electrode, lithium ions may be supplied from the cathode during battery charging and plated on the anode active material layer, and a lithium metal layer may be formed on the anode active material layer, thereby obtaining a high-capacity anode.

The separator separates the anode and the cathode, and provides a passage for lithium ions to move. Any separator may be used without particular limitation as long as it is generally used as a separator in a lithium secondary battery. That is, a separator having excellent electrolyte impregnation ability while having low resistance to the migration of electrolyte ions can be used. For example, the separator may be selected from glass fiber, polyester, Teflon, polyethylene, polypropylene, polytetrafluoroethylene (PTFE) or a combination thereof, and a non-woven fabric or a woven fabric form may be used.

For example, a polyolefin-based polymer separator such as polyethylene, polypropylene, or a separator including a coating layer containing ceramic components or polymer materials to secure heat resistance or mechanical strength can be used. The separator may be used as a single layer or a multilayer structure. In one embodiment, as the separator, a separator prepared by coating a ceramic coating material containing ceramic particles and an ionic binder polymer onto both surfaces of a polyolefin-based polymer substrate may be used.

As the electrolyte, an electrolyte solution including a lithium salt and a non-aqueous organic solvent, an organic solid electrolyte, an inorganic solid electrolyte, and the like, which are usually used in a lithium secondary battery, may be used.

The electrolyte solution contains a non-aqueous organic solvent and a lithium salt.

The non-aqueous organic solvent serves as a medium capable of moving ions that are involved in an electrochemical reaction of a battery.

The non-aqueous organic solvent may include a carbonate-based, ester-based, ether-based, ketone-based, alcohol-based, or aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. Examples of the ester-based solvent may include methyl acetate, ethyl acetate, n-propyl acetate, 1,1-dimethylethylacetate, methylpropionate, ethylpropionate, γ-butyrolactone, decanolide, valerolactone, mevalonolactone, caprolactone, and the like. Examples of the ether-based solvent may include dibutyl ether, tetraglyme, diglyme, dimethoxy ethane, 2-methyltetrahydrofuran, tetrahydrofuran, and the like. Examples of the ketone-based solvent may include cyclohexanone and the like. Examples of the alcohol-based solvent may include ethyl alcohol, isopropyl alcohol, and the like. Examples of the aprotic solvent may include nitriles such as R—CN (where R is a C2 to C20 linear, branched, or cyclic hydrocarbon group, a double bond aromatic ring, or an ether bond), amides such as dimethylformamide, dioxolanes such as 1,3-dioxolane, sulfolane, and the like.

The non-aqueous organic solvents may be used alone or in a mixture of two or more thereof. When the solvents are used in a combination of two or more, the mixing ratio thereof may be appropriately controlled according to the desired battery performance, which may be widely understood by those worked in the art.

In addition, when the carbonate-based solvent is used, it is favorable to use cyclic carbonate and chained carbonate in a mixture thereof. In this case, the cyclic carbonate and the chained carbonate are mixed at a volume ratio of 1:1 to 1:9, so that the performance of the electrolyte can be favorably exhibited.

The non-aqueous organic solvent may further include an aromatic hydrocarbon-based organic solvent in addition to the carbonate-based solvent. Here, the carbonate-based solvent and the aromatic hydrocarbon based organic solvent may be mixed at a volume ratio of 1:1 to 30:1.

The non-aqueous electrolyte may further contain vinylene carbonate or an ethylene carbonate-based compound in order to improve the battery lifetime.

Representative examples of the ethylene carbonate-based compound may include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. When the vinylene carbonate or the ethylene carbonate-based compound is further used, the use amounts thereof may be appropriately adjusted to improve the lifetime.

The lithium salt is dissolved in the non-aqueous organic solvent to act as a lithium ion supply source in the battery, thereby enabling a basic operation of a lithium secondary battery and promoting the movement of lithium ions between a cathode and an anode. Representative examples of the lithium salt includes $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (where, x and y are natural numbers), LiCl, LiI, $LiB(C_2O_4)_2$ (lithium bis(oxalato) borate; LiBOB) or a combination thereof, and these are included as supporting electrolytic salts. The concentration of the lithium salt is preferably used within the range of 0.1 to 2.0M. When the concentration of the lithium salt is included within this range, the electrolyte has adequate conductivity and viscosity, thereby exhibiting excellent electrolyte performance, and effectively moving lithium ions.

Among the electrolytes, in the case of an electrolyte containing a large amount of FEC (fluoroethylene carbonate), which is known as an electrolyte suitable for lithium metal batteries, a high concentrated electrolyte, an electrolyte containing a fluorinated ether diluting solvent such as TTE (1,1,2,2-tetrafluoroethyl-2,2,3,3-tetrafluoropropyl ether), OTE (1H,1H,5H-octafluoropentyl-1,1,2,2-tetrafluoroethyl ether), the suppression of side reactions of the electrolyte solution with the lithium plated layer is maximized, which can be the most preferable example for this experiment. That is, an electrolyte for suppressing a side reaction of the electrolyte may be preferably used in the present disclosure.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The method of manufacturing a lithium secondary battery is not particularly limited, and in an example, the lithium secondary battery can be manufactured by a process in which the cathode, the separator, and the anode are sequentially stacked to prepare an electrode assembly, which is placed in a battery case, and an electrolyte solution is injected into the upper part of the case, and sealed with a cap plate and a gasket. When a solid electrolyte is contained as an electrolyte, a solid electrolyte may be located between the cathode and the anode in place of the separator.

Next, the battery assembled as described above is overcharged by cathode load designed to be higher than the anode load, thereby manufacturing a final lithium secondary battery.

The FIGURE is a schematic diagram illustrating a change of an anode in a method of manufacturing a lithium secondary battery of the present disclosure.

At the time of initial battery assembly, the anode contains an anode current collector 10 and an anode active material layer 21. Thereafter, when the assembled battery is overcharged, the lithium desorbed from the cathode active material layer is first intercalated with the active material contained in the anode active material layer. After the intercalation is all completed, it is plated on the pores and surfaces in the anode active material layer. Since the anode active material layer has a very large specific surface area, a low current density, and a low overvoltage for a lithium plating reaction, the lithium metal does not grow in a dendritic shape during the lithium metal plating process, and uniform plating may occur. As a result, the plated lithium metal can serve as a second anode active material.

The anode 100 of the lithium secondary battery finally manufactured after completion of the overcharging step includes a current collector 10, an anode active material layer 22 and a lithium metal layer 23 in which lithium is intercalated, and both the anode active material and lithium metal included in the anode active material layer 22 and the lithium metal layer 23 may be used as an active material of the anode.

The overcharging step may be performed by charging once, or it may be carried out by charging twice or more in succession, comprising a first charging and a second charging in succession. The charging method can use various charging methods such as constant current-constant voltage mode (CC-CV mode), constant current mode (CC mode), constant voltage mode (CV mode), and constant power mode (CP mode) charging, without being particularly limited.

When the overcharging step is performed by charging once, charging of the anode active material (lithium intercalation) and plating of lithium metal occur continuously. As the charging method, an appropriate method of various charging methods as described above can be selected. However, when charging is performed by only the capacity of the cathode designed to be higher than that of the anode, overcharging proceeds to the anode, so that a lithium plating layer may be formed after charging the anode active material. At this time, when the overcharging step is performed by charging twice in succession, a primary charging is performed to the extent that first charging of the active material included in the anode active material layer occurs, and then second charging may be performed so that lithium metal can be continuously plated. At this time, the conditions for first charging and second charging may be set differently in consideration of the characteristics of each step.

Specifically, twice consecutive charges may be performed by a process in which the first charging is performed to correspond to initial load amount of the anode active material layer, and at the time of the second charging, charge is performed to correspond to remaining cathode load amount, thereby performing two consecutive charges. At this time, if high rate charging is performed in the step of plating lithium metal, the side reaction of the electrolyte may become severe and the internal resistance may increase. Thus, it is preferable to lower the current during the secondary charging than during the primary charging.

The thickness of the lithium metal layer generated after the overcharging step may range from 1 to 5000%, or from 1 to 200% of the thickness of the anode active material layer. By satisfying such a range, high capacity and long life can be realized.

Hereinafter, preferred examples of the present disclosure, comparative examples, and experimental examples for evaluating them are described. However, it is obvious to those skilled in the art that these examples are for illustrative purposes only, and that various changes and modifications can be made within the scope and spirit of the present description, and it goes without saying that such modifications and variations fall within the scope of the appended claims.

Example 1

Manufacture of Cathode $LiNi_{0.6}Co_{0.2}Mn_{0.2}O_2$ was used as a cathode active material, and a conductive material (carbon black) and a binder (PVdF) were added to NMP (N-methyl-2-pyrrolidone), and mixed in a weight ratio of 94:3:3 to prepare a cathode mixture.

The prepared cathode mixture was coated onto an aluminum foil having a thickness of 20 μm at a load amount of 4.5 mAh/cm², and then rolled and dried to manufacture a cathode.

Manufacture of Anode

Artificial graphite was used as the anode, and a conductive material (carbon black) and a binder (PVdF) were added to NMP (N-methyl-2-pyrrolidone) in a weight ratio of 95:3:2 and mixed to produce an anode mixture.

The produced anode mixture was coated on a 20 μm-thick copper foil at 3.0 mAh/cm², and then rolled and dried to manufacture an anode.

Manufacture of Secondary Battery

A separator (DB307B, BA1 SRS composition, thickness: 15 μm, cloth 7 μm, a total coating thickness of 8 μm, coated to a thickness of 4 μm per one surface of SRS) was interposed between the anode and the cathode, and laminated at a linear pressure of 1 kgf/mm to manufacture an electrode assembly. The electrode assembly was then housed in a pouch-type battery case, and a non-aqueous electrolyte, in which propylene carbonate and dimethyl carbonate were mixed in a volume ratio of 2:8 and 3.8M LiFSI was contained as lithium salt, was added thereto to manufacture a pouch type lithium secondary battery.

Charging Process

The lithium secondary battery was charged at 0.2 C by the cathode load amount of 4.5 mAh/cm².

Example 2

The lithium secondary battery was manufactured in the same manner as in Example 1, except that in the charging process of Example 1, the produced lithium secondary battery was charged at 0.2 C by the anode load amount of 3 mAh/cm², and then charged again at 0.1 C by the remaining 1.5 mAh/cm².

Example 3

The lithium secondary battery was manufactured in the same manner as in Example 1, except that in the process of producing the cathode of Example 1, $LiNi_{0.6}Co_{0.2}Mn_{0.2}O_2$ was used as a cathode active material, and an irreversible additive ($Li_2NiO_2$), a conductive material (carbon black) and a binder (PVdF) were added to NMP (N-methyl-2-pyrrolidone) in a weight ratio of 88:2:5:4 to manufacture a cathode mixture.

Example 4

The lithium secondary battery was manufactured in the same manner as in Example 1, except that in the charging process of Example 1, the produced lithium secondary battery was charged at 0.2 C by the anode load amount of 3 mAh/cm², and then charged again at 0.3 C by the remaining 1.5 mAh/cm².

Comparative Example 1

The lithium secondary battery was manufactured in the same manner as in Example 1, except that in the charging process of Example 1, the produced lithium secondary battery was charged at 0.2 C by the anode load amount of 3 mAh/cm².

Comparative Example 2

The lithium secondary battery was manufactured in the same manner as in Example 1, except that a lithium metal negative electrode of 60 μm was applied as the anode active material in Example 1.

Experimental Example 1

In Examples 1 to 3 and Comparative Example 1, the load amounts of the cathode and the anode were measured as follows.

To measure the load amount of the cathode, the cathode was coin-punched to 1.6 cm², and proceeded with coin half cell evaluation using a Li metal electrode as the counter electrode to measure the expression capacity. By dividing the cathode area from the measured expression capacity, the cathode load amount can be calculated. Then, the anode was coin-punched to 1.6 cm² and proceeded with the coin half cell evaluation using a Li metal electrode as the counter electrode to measure the expression capacity. By dividing the area of the anode from the measured expression capacity, the anode load amount can be calculated. The anode load amount was divided by the calculated cathode load amount and is shown in Table 1 below.

TABLE 1

|  | Ratio of load amount |
| --- | --- |
| Example 1 | 0.67 |
| Example 2 | 0.67 |
| Example 3 | 0.60 |
| Example 4 | 0.67 |
| Comparative Example 1 | 0.67 |

Experimental Example 2

After the lithium secondary battery charged in Examples 1 to 4 and Comparative Examples 1 to 2 was completely discharged at 0.5 C, the measured charge/discharge capacity values are shown in Table 2. Again, the cycle evaluation was performed at room temperature to the 200th cycle under the same charge/discharge conditions, and the capacity retention rate was calculated and shown in Table 2. (The value calculated by the discharge capacity after 200 cycles/the discharge capacity after 1 cycle)×100 is indicated by a life retention rate (%))

TABLE 2

|  | Initial charge capacity (mAh) | Initial discharge capacity (mAh) | capacity retention rate @ 200th cycle |
| --- | --- | --- | --- |
| Example 1 | 75 | 69 | 96% |
| Example 2 | 76 | 70 | 99% |
| Example 3 | 80 | 69 | 99% |
| Example 4 | 75 | 70 | 95% |
| Comparative Example 1 | 50 | 46 | 96% |
| Comparative Example 2 | 75 | 69 | 75% |

Referring to Table 2, it was confirmed that in the case of Examples 1 to 4, charging was performed so that intercalation of the anode active material and plating of lithium metal were continuously generated, so that the initial charge/discharge capacity appeared high, thereby manufacturing a high-capacity battery. In addition, it was confirmed that when checking the capacity retention rate in the 200th cycle, charging was performed only as much as the load amount of the anode, and it exhibits the same life characteristics as Comparative Example 1 in which only intercalation was performed on the anode active material, and also exhibits better life characteristics than Comparative Example 2 in which only lithium metal was used as the negative electrode active material and charging was performed by only lithium plating.

On the other hand, it was confirmed that Comparative Example 1, in which charging was performed by the anode load amount, has good lifetime characteristics, but the basic capacity is significantly smaller compared to Examples according to the present disclosure.

Furthermore, it can be seen that Example 2, in which charging was performed twice, exhibits more excellent lifetime characteristics than Example 1, in which charging was performed once. However, since Example 4 in which the second charging was performed at a high current is similar to lifetime of Example 1, and thus, performing the second charging with a low current while performing twice charging is the most excellent in terms of lifetime characteristics.

INDUSTRIAL AVAILABILITY

According to the present disclosure, it is possible to manufacture a lithium secondary battery that can exhibit improved capacity and energy density compared to existing lithium ion batteries and lithium metal secondary batteries, and has excellent safety and lifetime characteristics.

The invention claimed is:
1. A method for manufacturing a lithium secondary battery comprising the steps of:
assembling a battery comprising an anode having an anode active material layer coated onto at least one surface of an anode current collector; a cathode having a cathode active material layer coated onto at least one surface of a cathode current collector; a separator; and an electrolyte, and
charging the battery,
wherein in the step of assembling the battery, a ratio of an anode load amount to a cathode load amount (N/P ratio) is 0.01 to 0.99,
wherein in the step of charging the battery, the charging is performed based on the cathode load amount,
wherein in the step of charging the battery, lithium is plated on pores and surfaces of the anode active mate- rial layer to form a lithium metal layer on at least one surface of the anode active material layer, wherein the battery charging step comprises a first charging and a second charging in succession, and wherein in the step of charging the battery, a charging current of second charging is lower than a charging current of first charging.

2. The method for manufacturing the lithium secondary battery according to claim 1, wherein a thickness of the lithium metal layer is 1% to 5000% of the thickness of the anode active material layer.

3. The method for manufacturing the lithium secondary battery according to claim 1, wherein the cathode load amount per unit area of the cathode active material layer is 4 mAh/cm$^2$ to 15 mAh/cm$^2$.

4. The method for manufacturing the lithium secondary battery according to claim 1, wherein the cathode active material layer further comprises at least one irreversible additive selected from the group consisting of $Li_{7/3}Ti_{5/3}O_4$, $Li_{2.3}Mo_6S_{7.7}$, $Li_2NiO_2$, $Li_2CuO_2$, $Li_6CoO_4$, $Li_5FeO_4$, $Li_6MnO_4$, $Li_2MoO_3$, $Li_3N$, $Li_2O$, LiOH and $Li_2CO_3$.

5. The method for manufacturing the lithium secondary battery according to claim 4, wherein the irreversible additive is present in an amount of 10% by weight or less of a total weight of the cathode active material layer.

6. The method for manufacturing the lithium secondary battery according to claim 1, wherein the anode active material layer comprises an anode active material comprising at least one selected from: a carbon-based active material; an alloy of lithium with a metal selected from the group consisting of sodium, potassium, rubidium, cesium, francium, beryllium, magnesium, calcium, strontium, barium, radium, aluminum, germanium and tin; a silicon-based active material; a tin-based active material; or a lithium titanium oxide.

7. The method for manufacturing the lithium secondary battery according to claim 1, wherein in the step of charging the battery, the battery is charged by an amount equal to the cathode load amount.

* * * * *